No. 607,057. Patented July 12, 1898.
J. A. LABATT & G. H. LEWIS.
VEHICLE WHEEL.
(Application filed Oct. 11, 1897.)
(No Model.)
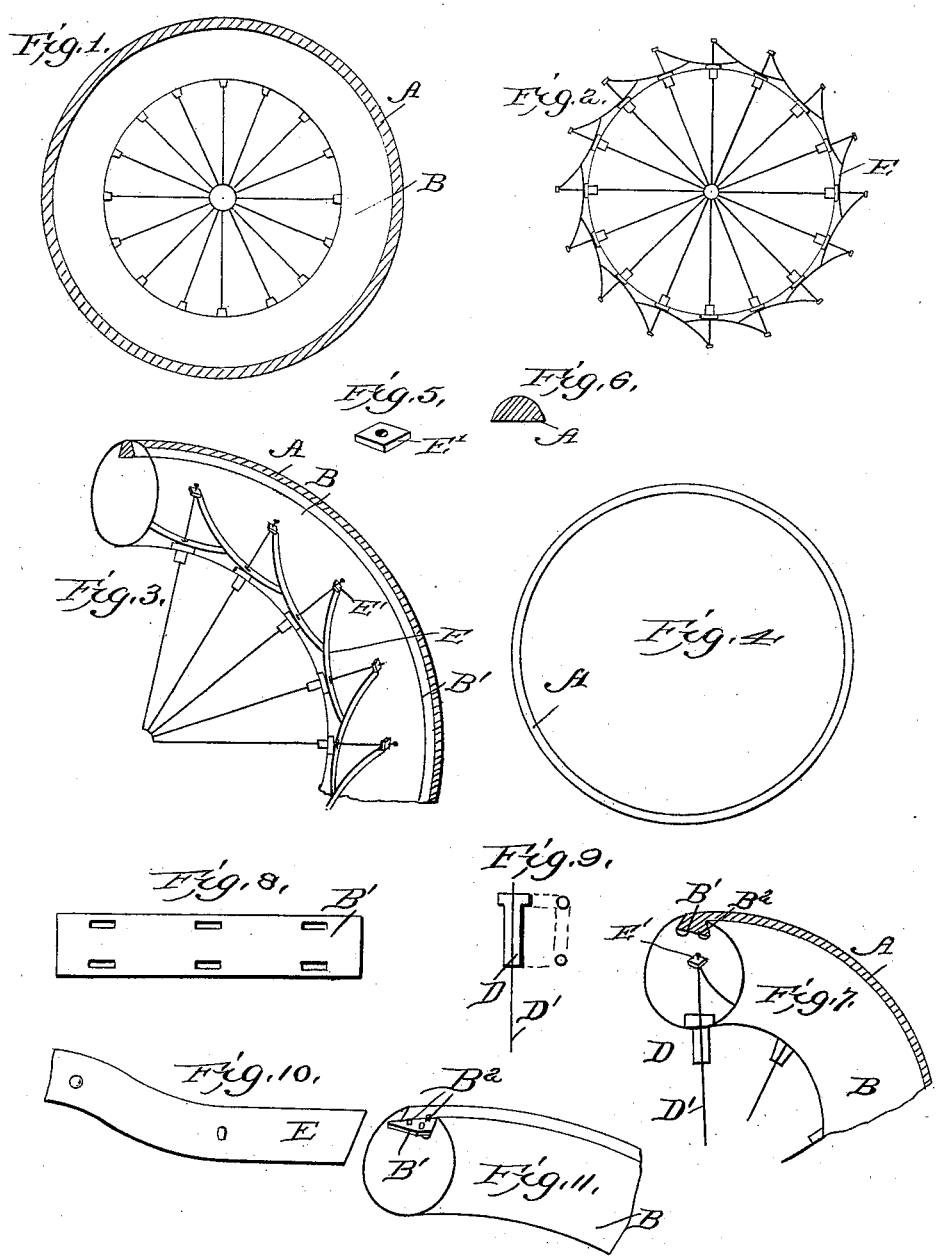
Attest
Wm. F. Hall
C. S. Middleton
Inventors
Joseph Augustus Labatt
George Harris Lewis
by Richards & Co,
Attys.

UNITED STATES PATENT OFFICE.

JOSEPH AUGUSTUS LABATT AND GEORGE HARRIS LEWIS, OF GALVESTON, TEXAS, ASSIGNORS OF ONE-HALF TO JOHN GOGGAN, LEON BLUM, AND HENRY J. LABATT, OF SAME PLACE.

VEHICLE-WHEEL.

SPECIFICATION forming part of Letters Patent No. 607,057, dated July 12, 1898.

Application filed October 11, 1897. Serial No. 654,847. (No model.)

*To all whom it may concern:*

Be it known that we, JOSEPH AUGUSTUS LABATT and GEORGE HARRIS LEWIS, citizens of the United States, residing at Galveston, in the county of Galveston, State of Texas, have invented certain new and useful Improvements in the Construction of Wheels for Vehicles; and we do hereby declare that the following is a full, clear, and exact description of the invention.

Our invention relates to an improvement in vehicle-wheels, the object being to provide a continuously-controlled spring around the entire circumference of rim and tire adapted to be employed instead of the customary pneumatic tire, whereby the tire will possess a high degree of resiliency.

A further object of this invention is so to construct the rim and the tire and connect the same by the medium of springs to movable spokes and thence to the hub of the wheel that the wheel will be given a maximum strength with a minimum of weight, and also the auxiliary tire will be a solid-rubber tire, not yielding under undue pressure.

Reference is made to the accompanying drawings, forming a part of this specification, in which similar characters of reference indicate corresponding parts in all the figures.

Figure 1 is a side view of the wheel completed. Fig. 2 is a view of arrangement of springs. Fig. 3 is a sectional view of wheel, showing thimble and springs with movable spokes in aluminium tire B and auxiliary tire in position on rim-plate. Fig. 4 is a view of the auxiliary tire of rubber for tread. Fig. 5 is a view of the nut for fastening springs on movable spokes. Fig. 6 is a sectional view of auxiliary rubber tire for tread. Fig. 7 is a sectional view of wheel. Fig. 8 is a view of the rim-plate. Fig. 9 is a view of the thimble-guide and section of movable spoke. Fig. 10 is a view of the spring. Fig. 11 is a view of aluminium tire, showing teeth $B^2$ for holding rim-plate and auxiliary tire in position.

The springs between the flanges of the rim are wholly within the same. The movable spokes are passed through the openings in the springs and are made secure by a nut. The auxiliary tire is preferably solid and is made of rubber or equivalent material. This tire is fitted to the concavity in the rim, and thus a springy tire is obtained, which has all the advantages of a pneumatic tire without the numerous disadvantages. The tire of this wheel cannot be injured by punctures, and as the wheel revolves under pressure the lower stretch of the wheel is not depressed unduly, thus requiring less power to propel the wheel, owing to action taking place through springs attached to movable spokes, thereby giving depression at axle-point, thus compelling point of contact with ground always to remain positive, thereby not increasing traction force. Each spring has an approximately central opening through which one of the spokes is loosely passed and thus retains the spring against displacement in the tube. One end of the spring is curved or extended out into line with the next spoke, to which it is secured in suitable manner, while the opposite end of the spring bears against the under face of the next adjoining spring. No reaction is permitted through horizontal section of wheel at any time, owing to said construction, as shown by reference to drawings.

The spokes D' being constructed so as to move freely in brass thimble-guides D and the ends of spoke D' being connected to springs E, secured thereto by nuts E', the action of said springs E is to give resiliency similar in effect acquired by pneumatic tires. The springs E also by their construction, as shown in Figs. 2 and 3, admit of their use to keep thimble-guide D from moving in tire B of wheel. The springs E are constructed so as to form one continuous spring around entire circumference of tire B and are not attached at any point to tire B, but being compressed to center of tire and being free at rim-plate B'. The action of compression of springs E serves to keep spokes D' firmly in position the same as though the spokes D' were fastened to tire, said springs E being constructed as shown in Fig. 3 and 10. The tire B is constructed as shown in Fig. 11, being made of aluminium and constructed to receive a rim-plate B', as in Fig. 8, covering opening to springs and also to receive an auxiliary tire of rubber or equivalent material, as in Fig. 4, to act as tread for tire B, as shown in Fig. 7. The function of said auxiliary tire is to act as a cushion to prevent noise and wear of tire B. The tire B has small projections $B^2$, as shown in Fig. 11, to go through holes in rim-plate, as shown in Fig. 8, and projections also to act to prevent auxiliary tire A, Fig. 4, from moving around tire B. By the construction of said tire B, Fig. 7, and springs E, Fig. 2, acting on movable spokes D', through thimble-guide D, said springs E are enabled to receive all undue shocks and compensate for same through movable spokes to center bearing of wheel.

Having fully described our invention, what we claim, and desire to secure by Letters Patent, is—

1. In combination, the tubular tire, the spokes loosely passing into the same, and the series of independent springs carried within the tube, each spring having one end connected to one of the spokes, an opening approximately centrally thereof through which the next spoke passes, and having its opposite end bearing against the under face of the next adjoining spring, substantially as described.

2. In combination, the tubular metallic rim, the spokes passing loosely into the same, the series of springs located within the tube, each spring having one end connected to the extremity of one spoke, having an opening approximately centrally thereof through which the next spoke passes, and having its opposite end bearing against the under side of the adjoining spring, and an auxiliary tire or tread portion for said tubular rim, substantially as described.

JOSEPH AUGUSTUS LABATT.
GEORGE HARRIS LEWIS.

Witnesses:
WM. B. LOCKHART,
HENRY J. LABATT.